ns to lower costs, so its output is empty.

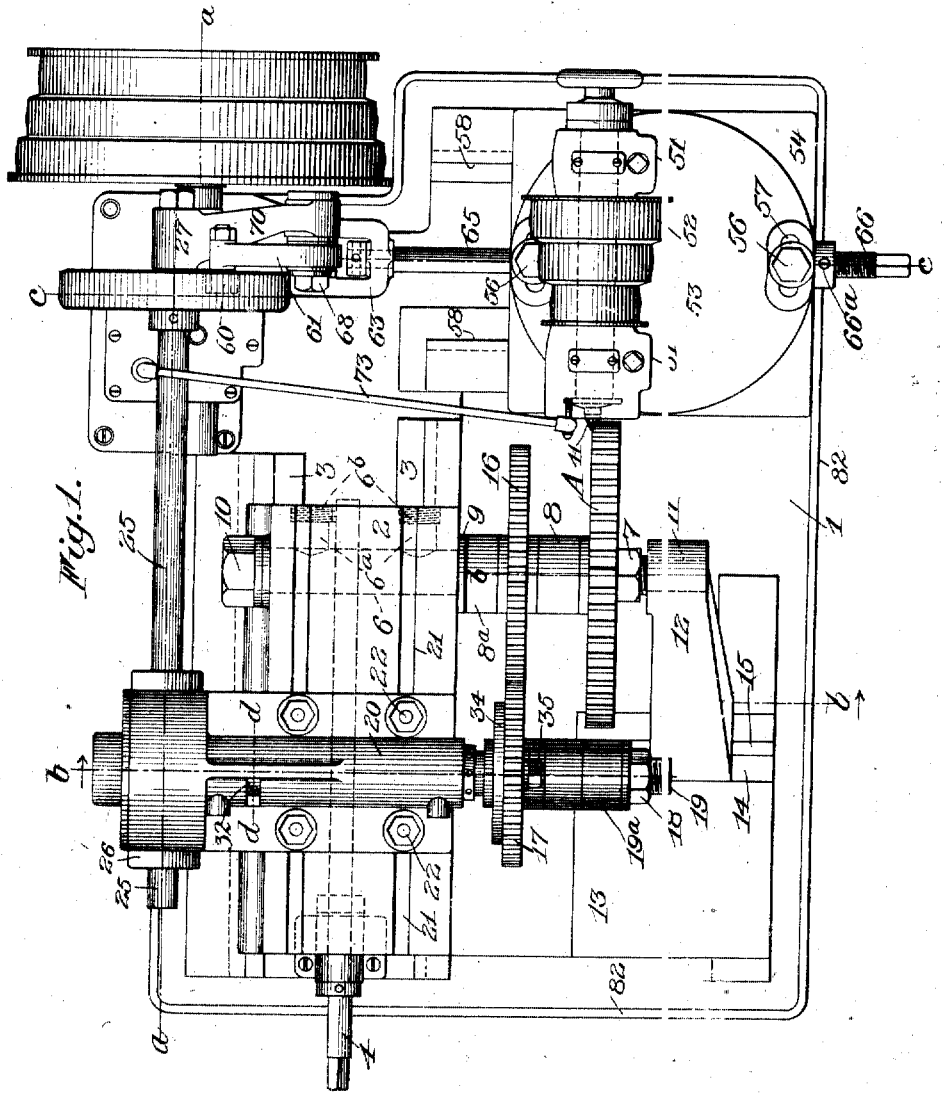

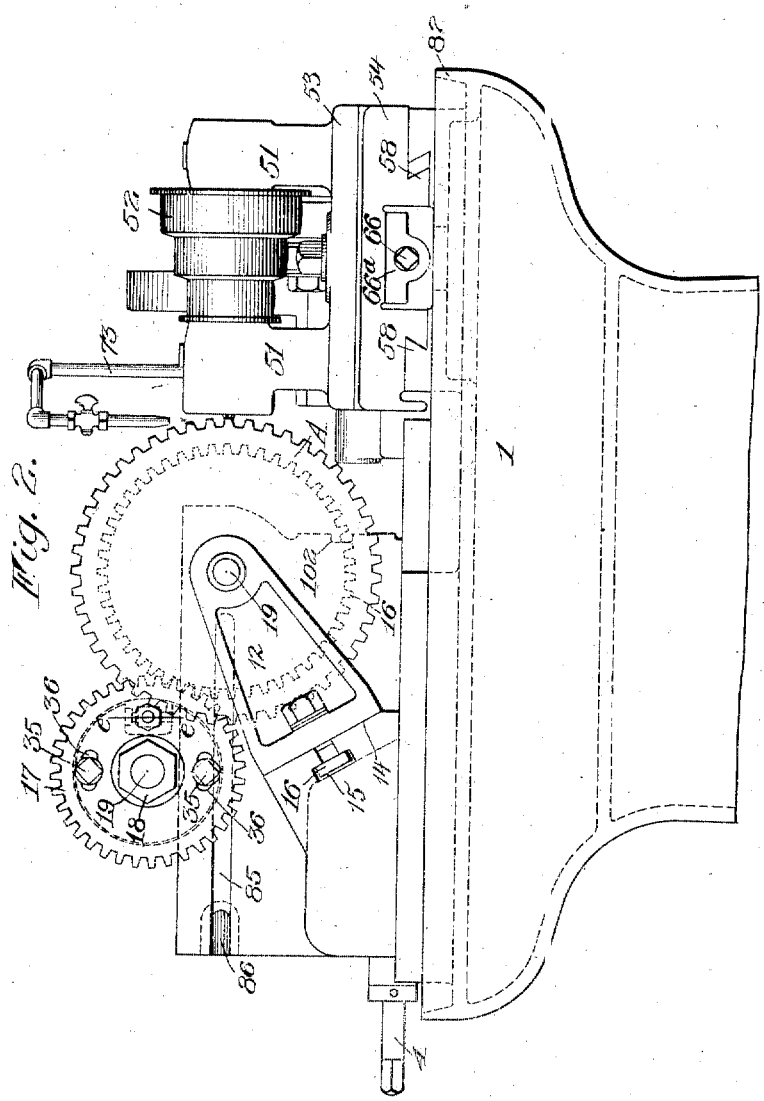

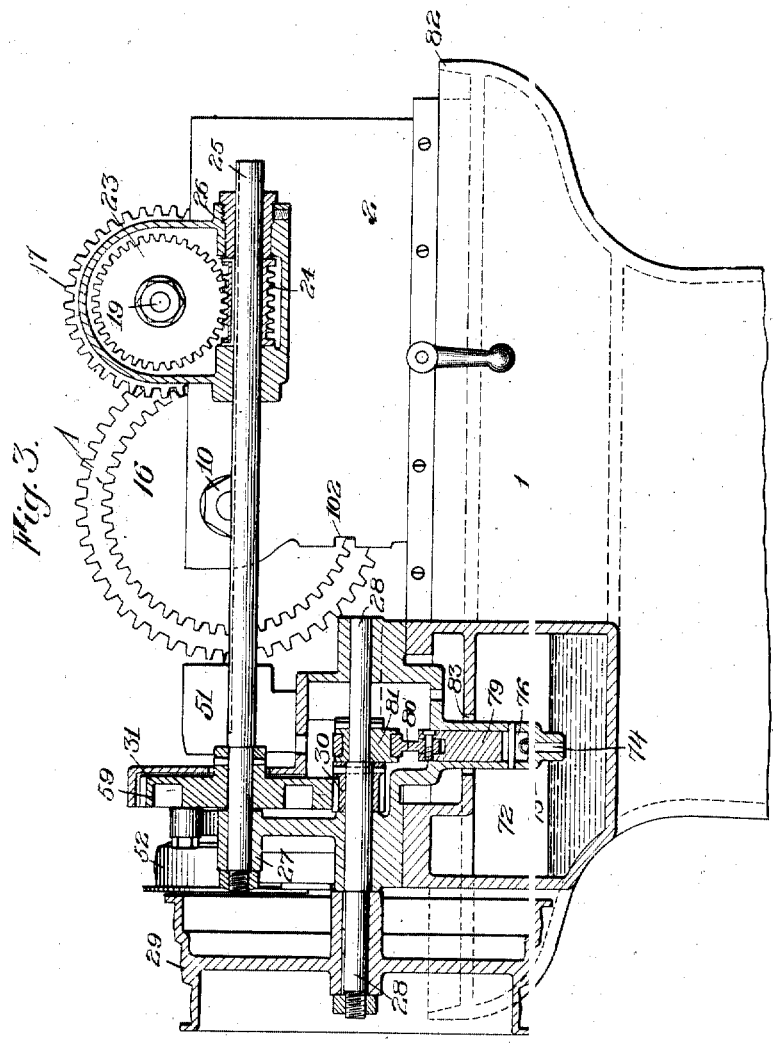

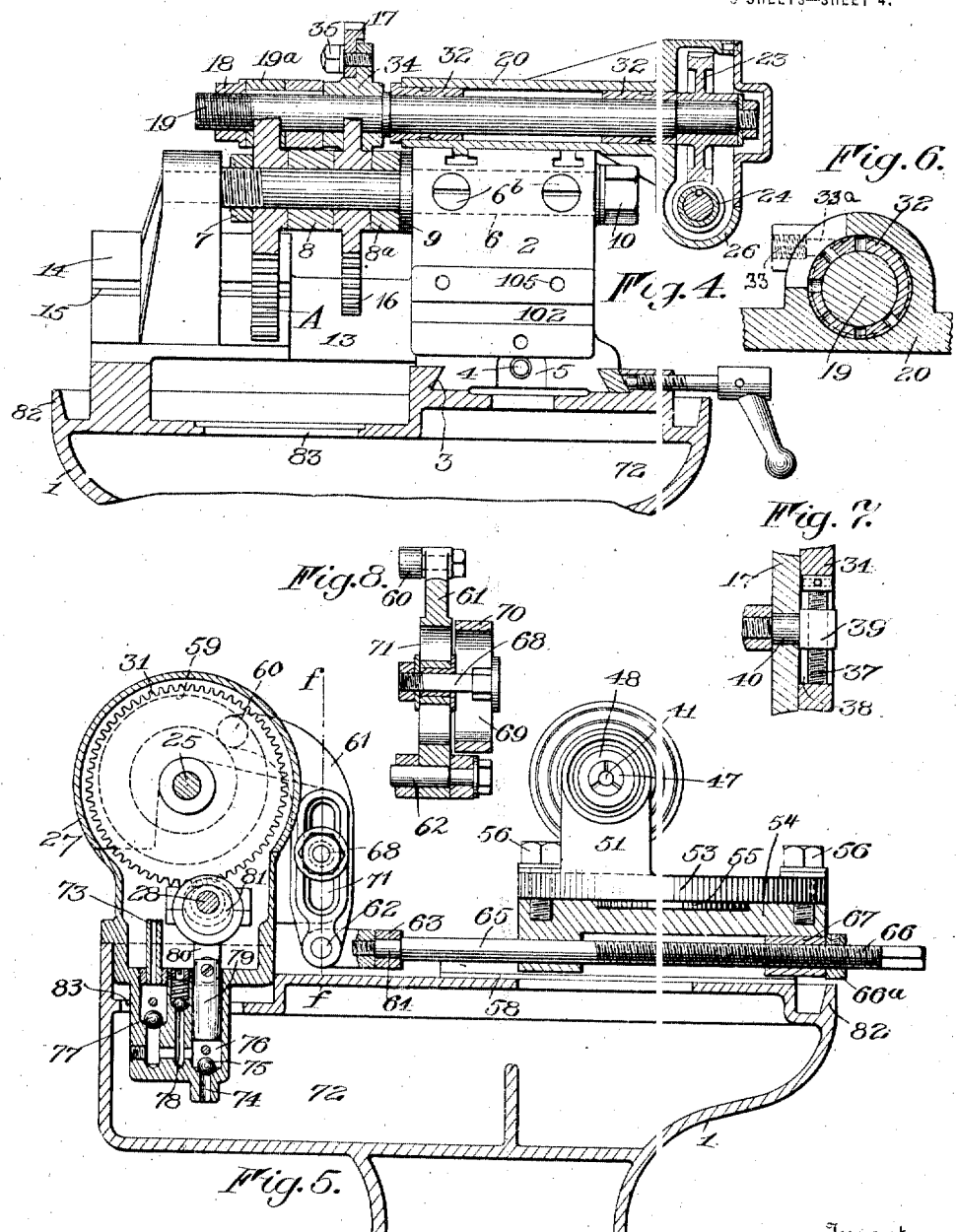

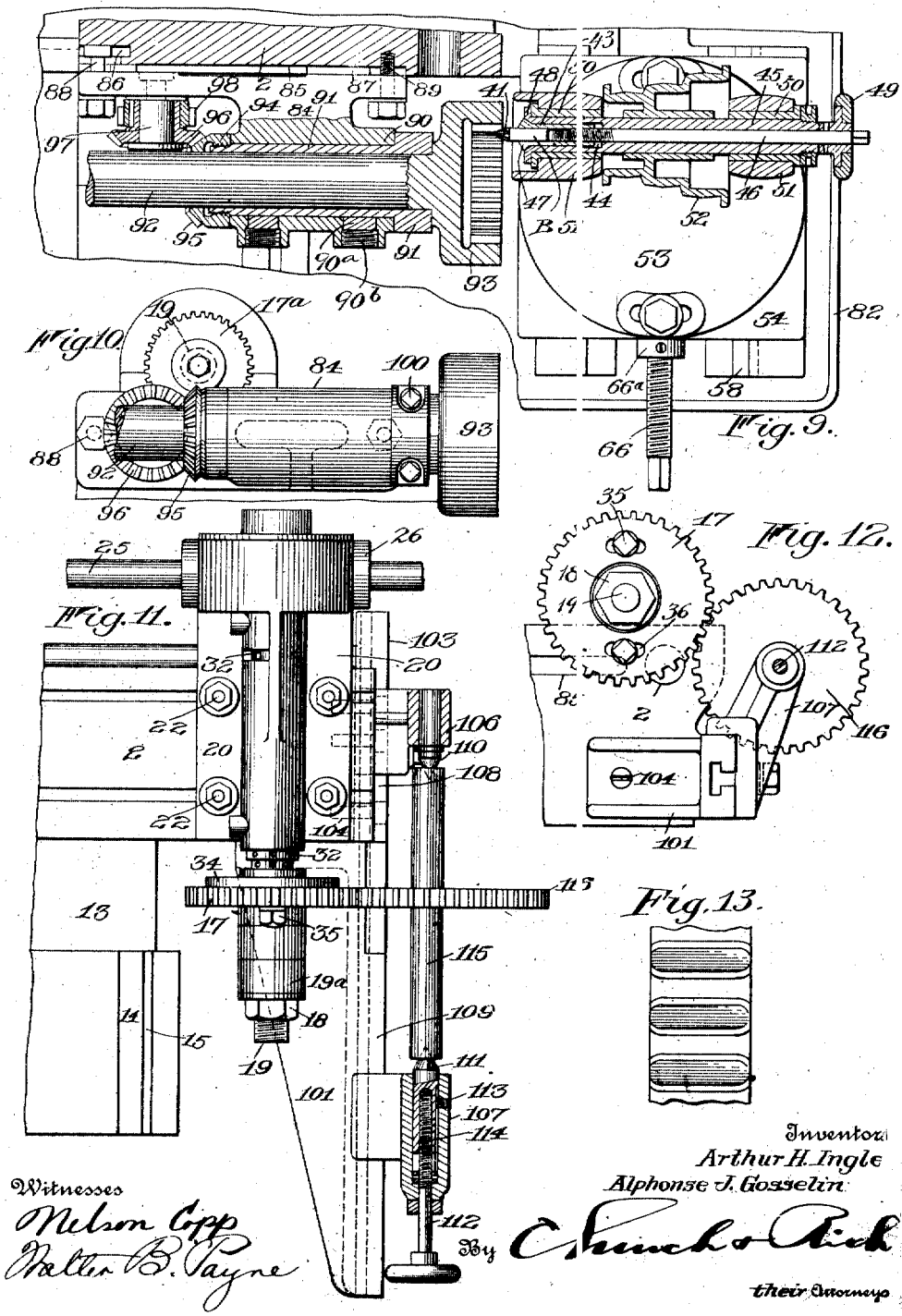

UNITED STATES PATENT OFFICE.

ARTHUR H. INGLE AND ALPHONSE J. GOSSELIN, OF ROCHESTER, NEW YORK, ASSIGNORS, BY MESNE ASSIGNMENTS, TO INGLE CORPORATION, OF MONROE COUNTY, NEW YORK, A CORPORATION OF NEW YORK.

GEAR-TOOTH-ROUNDING MACHINE.

1,216,454.      Specification of Letters Patent.      Patented Feb. 20, 1917.

Application filed July 5, 1912. Serial No. 707,711.

*To all whom it may concern:*

Be it known that we, ARTHUR H. INGLE and ALPHONSE J. GOSSELIN, both of Rochester, in the county of Monroe and State of New York, have invented certain new and useful Improvements in Gear-Tooth-Rounding Machines; and we do hereby declare the following to be a full, clear, and exact description of the same, reference being had to the accompanying drawings, forming a part of this specification, and to the reference-numerals marked thereon.

The present invention relates to machines for rounding or chamfering the teeth of gears and especially those used in transmission gearing; an object of the invention being to provide a construction which may be readily adjusted to operate on various types and sizes of gears, such as internal gears and external gears with and without shafts. To these and other ends the invention consists in certain improvements and combinations of parts all as will be hereinafter more fully described, the novel features being pointed out in the claims at the end of the specification.

In the drawings:

Figure 1 is a top view of a machine constructed in accordance with this invention, with a shaftless gear in position thereon;

Fig. 2 is a front view of the same machine;

Fig. 3 is a vertical section on the line *a—a* of Fig. 1;

Fig. 4 is a vertical section on the line *b—b* of Fig. 1;

Fig. 5 is a vertical section on the line *c—c* of Fig. 1;

Fig. 6 is a detail section on the line *d—d* of Fig. 1;

Fig. 7 is a detail section on the line *e—e* of Fig. 2;

Fig. 8 is a detail section on the line *f—f* of Fig. 5;

Figs. 9 and 10 are respectively a horizontal section and a detail side view showing an attachment permitting the rounding of internal gears, and Figs. 11 and 12 are detail views showing an attachment adapting the machine for operating upon gears having integral spindles or shaft.

Fig. 13 is a view showing part of the edge of a gear wheel, the teeth of which are shown rounded as the result of the operations performed by the machine.

In carrying out the invention, there is employed a suitable work support and a suitable tool holder, the operations being such that the gear or work piece is rotated at a certain speed while a relative movement between the work piece and the tool, during such rotation causes the tool to travel in engagement with one face of a tooth, thence in contact with an outer side or an end of the tooth and finally in contact with the opposite face of the tooth, thus causing the rounding or chamfering of the tooth. The successive tooth, due to the rotation of the work piece, is then presented to the tool and is treated in the same manner and this is continued until all of the teeth have been rounded or chamfered to the proper degree on one side.

With the end in view of supporting the work there may be employed a carriage 2, which, in this instance, is horizontally adjustable on the top of a main frame 1 by means of coöperating guides 3. The movement of this carriage may be effected in any suitable manner, but, in this instance, there is employed a screw shaft 4 turning idly on the frame 1 and coöperating with the nut 5 on the carriage 2.

To rotatably support an external gear or work piece A without a shaft, there may be employed a shaft 6 projecting laterally from and turning in the carriage 2, the work piece A being secured to the projecting portion of the shaft. Preferably a nut 7 on the shaft clamps the work piece against the sleeve 8 which is arranged on the shaft between the work piece and a flange or abutment 9 that also serves to prevent the axial movement of the shaft 6 within the carriage 2. The shaft 6 is removable from the carriage 2 in order that the machine may operate upon other kind of work, as will be hereinafter described, this preferably being effected by removing the nut 10 on that side of the carriage 2 opposite that in which the shaft projects. Friction pieces 6ª may engage the shaft 6 to prevent the latter turning too freely, these friction pieces being preferably forced against the shaft by screw plugs 6ᵇ closing lateral bores in the carriage 2 in which the friction pieces are located.

The extreme projecting end of the shaft 6 may be formed so as to provide a bearing to coöperate with the bearing in an arm 12. The arm 12 is preferably removably supported on the carriage 2 and to this end the latter is provided with an extension 13 on one side having an inclined face 14 formed with an inverted T-groove 15. The base of the arm 12 coöperates with the inclined face 14 and is held thereagainst by one or more bolts 16. The arm 12 is not only made removable for adapting the machine to operate upon another kind of work but it may be adjusted longitudinally of the groove 15 for accommodating the machine to work pieces having teeth of different width.

With the object in view of rotating the work piece A a gear wheel or pinion 16 may be secured to the shaft 6 preferably being clamped between the sleeve 8 and a sleeve 8ᵃ. The diameter of this gear wheel varies according to the diameter of the gear wheel or work piece whose teeth are to be rounded and it is therefore termed an indexing gear. The indexing gear may be driven by an intermeshing gear 17 removably held by a nut 18 upon a shaft 19. The latter also projects from one side of the carriage 2 parallel with shaft 6 and has a number of sleeves 19ᵃ thereon, said sleeves being removable, so that the drive gear may be placed nearer the end of the shaft 19 to directly engage the work piece and act as an indexing gear.

A carriage 20, which is adjustable relatively to the work piece supporting means and also relatively to the tool, may carry the shaft 19 and may be movable on the carriage 2 transversely of the shaft 6, in order that the gear wheel 17 may be brought to or moved away from the shaft 6 to drive work pieces of different diameters. Preferably the adjustment is effected by providing the top of the carriage 2 with T-grooves 21 which receive the heads of bolts 22 on the carriage 20.

In order to drive the shaft 19, the latter may be provided with worm wheel 23 which meshes with a worm 24 arranged to turn with and adjustable longitudinally of and on a shaft 25, a casing 26 inclosing the worm wheel and the worm and coöperating with the latter in such a manner that it is held in coöperative relation with the worm wheel 23. The shaft 25 is supported independently of the carriage 20 and preferably at one end on a casting 27 which is firmly supported by and bolted to the frame 1. The casting 27 may also support the drive shaft 28 to which the drive pulley 29 is secured, driving connection between the drive shaft 28 and its counter shaft 25 being preferably established by means of a pinion 30 meshing with the larger gear 31 on the shaft 25.

In order that the worm wheel 23 will lie in firm engagement with the worm 24, the shaft 19 may be carried by eccentric bearings 32 (see Fig. 6) which are mounted to turn in the carriage 20 to move the worm wheel 23 toward or from the worm 24 and establish a proper co-engagement between them. Set screws 33 may be employed to engage a pin 33ᵃ for holding the eccentric bearings 32 in their adjusted positions.

For the purpose of properly or accurately setting the work piece with relation to the tool on the initial adjustment of the apparatus, the drive gear 17 has a slight adjustment about its axis and relatively to the shaft 19. Preferably this is accomplished by providing a flanged hub 34 on the shaft 19 and securing the drive gear 17 to the front face of the hub by bolts 35 which operate in slots 36 in the gear 17. When the bolts 35 are loosened, a screw 37, arranged in the pocket 38 in the hub 34 may be turned in a nut 39 which is journaled at 40 in the gear 17 so that the latter is caused to partake of the movement of the nut. The screw, not being permitted to move axially in the pocket, will cause a relative movement between the parts.

The tool B (see Fig. 9) is preferably in the form of a rotary milling cutter having its free end beveled and milled at 41 and its inner end engaging within an internally threaded split sleeve 43. This sleeve is axially adjustable within an enlarged bore 44 of a hollow or tubular spindle or tool holder, the adjustment in this instance being effected by a screw member preferably in the form of a screw rod 46 which operates within the hollow spindle 45 and engages the threads of the adjustable sleeve 43, in order to draw the cone shaped end 47 of the sleeve 43 into engagement with the flared end 48 of the spindle 45, thus compressing the split sleeve upon the tool B and holding the latter in its adjusted position in the sleeve. The screw rod 46 may be operated by a hand wheel 49 in order to project or to draw in the sleeve 43.

The rotary tool holder or spindle 45 turns within bearings 50 on spaced standards 51; pulleys 52 being secured to the spindle 45 between the standards. The latter project upwardly from a table 53 rotatably supported on a carriage 54, preferably by means of an integral bearing 55 depending into a socket in the upper surface of the carriage 54, bolts 56 being secured to the carriage and operating in slots 57 in the table for the purpose of holding the table in adjusted position. The adjustment of the table on the carriage permits the tool to rotate about a vertical axis transverse to and to one side of the axis of rotation of the tool so that the tool may be positioned at an angle to the plane of the work piece or gear to be operated upon by the tool.

The relative reciprocating movement between the gear or work piece and the tool is in this instance effected by shifting the carriage 54 along guides 58 arranged transversely of the axis of rotation of the tool. Any suitable means may be employed for effecting the reciprocation of the carriage. In this instance the gear 31 is formed with a cam groove 59 in one face thereof, receiving a stud 60 on a two armed lever 61, the other end of the two armed lever being pivoted at 62 to a yoke 63 in which is journaled at 64 a screw connecting rod 65. The screw portion 66 of this connecting rod turns in a nut 67 on the carriage 54 so that it is possible by turning the rod 65 to shift the carriage 54 relatively to the lever 61, thus varying the effective length of the connecting rod and shifting the position of the tool relatively to the means which effects the reciprocation of the carriage. This adjustment of the carriage is for the purpose of increasing the length of travel of the tool from the end of the tooth toward the center thereof, or in other words, to provide means whereby the length of the rounded portion of the tooth may be varied, the carriage being held in proper position by a nut 66ᵃ on the rod 66 to limit the rotation of the rod. The adjustment may also be employed for shifting the position of the carriage to correspond with the position of the work piece.

To the end that the reciprocations of the carriage and consequently those of the tool may be varied in length to correspond in order to operate on gears of different sizes, there may be provided a shiftable fulcrum for the double arm lever 61: Preferably a pivot pin 68 is adjustably supported in a slot 69 formed in a bracket 70 on the casting 27. The lever 61 is also slotted at 71 to permit the pivot pin to be adjusted therein, so that, with the shortening of the length of one arm of the lever 61, the length of the other arm will be increased.

The machine may also be used for rounding or chamfering the teeth of internal gears (see Figs. 9 and 10) and to rotatably support such gears, the shaft 6 and the bracket 12 are first removed. A bracket 84 is then secured to one side of the carriage 2, the latter preferably having a way or groove 85 formed thereon and a T-slot 86 formed at one end of the way or groove 85. Projections 87 on the bracket 84 fit within the groove or way 85 and a T-bolt 88, together with a bolt 89, serve to hold the bracket in position on the side of the carriage. The bracket may be provided with a tubular bearing or sleeve 90 extending in the direction of the axis of the tool, and having a work holding sleeve 91 turning therein. To hold the sleeve 91 within the sleeve 90, a shoulder at one end of the sleeve 91 coöperates with one end of the bearing sleeve 90, while a nut 94 on the sleeve 91 coöperates with the opposite end of the sleeve 90. Friction pieces 90ᵃ engage the side of the sleeve 91 to prevent too free rotation of the latter, said friction pieces being held in pockets in the bearing 90 by means of plugs 90ᵇ.

The nut 94 may have formed thereon a bevel gear 95 which meshes with a beveled gear 96 turning on a headed stub shaft 97 that is bolted to the bracket 84. Removably secured to the beveled gear 96 is an indexing gear 98 which in turn meshes with a drive gear 17ᵃ on the shaft 19. The drive gear 17ᵃ is not adjustable on its shaft 19, as the proper or accurate position of the work can be obtained by turning the work piece 93 in the sleeve 91, the sleeve receiving the shaft 92 of such work piece. To hold the work piece against turning in the sleeve 91, the latter is split and clamped upon the shaft 92 preferably by screw bolts 100.

The machine may also be used for rounding the teeth of those gear wheels having shafts connected thereto integrally or otherwise. This is accomplished by the attachment shown in Figs. 11 and 12. The shaft 6 and the bracket 12 are removed the same as with the attachment shown in Figs. 9 and 10, and a bracket 101 is attached to the carriage 2, the latter preferably having a way 102 (see Fig. 4) to receive an arm 103 on the bracket 101, and the bracket being held to the carriage 2 by means of bolts 104 entering openings 105 in the carriage 2.

Arranged on the bracket 101 and its arm 103 are supports 106 and 107, said supports being respectively adjustable on ways 108 and 109 toward and from each other and carrying work supporting and centering pins 110 and 111 respectively, so that shafts of different lengths may be held. The pin 111 is adjustable axially on its support 107 by means of a screw rod 112, being held against turning in its support by screw 113 working in a groove 114 in the pin 111. The work piece 115 is supported by and turns upon the centering pins 110 and 111, the gear portion 116 intermeshing with the drive gear 17, thus dispensing with an indexing gear. Of course, with this construction the carriage 20 is adjusted so that it lies near the end of the carriage 2, this being necessary owing to the fact that the work support turns about an axis beyond the end of the carriage 2.

The operation of the machine will be understood from the foregoing description but it may be summarized as follows: Assuming that it is desired to round the teeth of a gear, such as shown in Fig. 1, in which the gear A is not provided with a permanent shaft. The gear or work piece is fitted onto the shaft 6 and held thereon by the nut 7, an indexing gear 16, corresponding to the gear A, being also secured to the shaft 6. The bracket arm 12 is then fitted to the extreme end of the shaft to support the latter against vibrations and the carriage 2 is adjusted so that the tool, when reciprocated transversely of its axis, will operate on the teeth of the gear A. The carriage 20 is adjusted so that the gear 17 meshes with the gear 16 and if the gear A is not accurately engaged by the tool B, the gear 17 is rotated upon its axis relatively to its shaft 19. The connecting rod 65 is turned so that the tool B but slightly engages the teeth of the work piece in order that upon the starting the machine the work piece or gear A will rotate and the tool will reciprocate transversely of its axis, causing the rounding of one side of each tooth. After a complete rotation of the work piece A has taken place, the connecting rod 65 is rotated so that the tool will take off still further material from the teeth of the wheel A and this is continued until the proper amount of material has been removed from the teeth.

For rounding the teeth of internal gears, the shaft 6 and the bracket arm 12 are removed. To the front of the carriage 2 the bracket 84 is secured, (see Figs. 9 and 10) so that the axis of rotation of the work supporting sleeve 91 is parallel with the axis of rotation of the tool B, the sleeve being geared to the shaft 19 by a gearing which corresponds to the diameter of the internal gear. With this attachment, the tool reciprocates transversely of its axis and transversely of the axis of rotation of the work piece, so that the tool passes from one face of the tooth to the next about the end of the tooth, instead of the side, as when the machine is adjusted as in Fig. 1. The result, however, is the same in both instances, that is, the teeth are rounded or chamfered to facilitate meshing.

With the attachment shown in Figs. 11 and 12 the shaft 6 and the bracket arm 12 are removed and the bracket 101 secured to the carriage 2. This bracket properly supports a gear wheel and its shaft in position to be driven by the shaft 19. The operation of the tool on the work piece or gear is substantially the same and in the form shown in Fig. 1.

From the foregoing it will be seen that there has been provided a gear tooth rounding machine adapted for operation upon gears of various types and sizes, attachments being provided for operatively supporting internal gears in position to be operated upon by the tool and attachments also being provided for the mounting of external gears with or without shafts in positions to be acted upon by the tool. The operation of the machine is simple and the construction of the parts thereof is such that durability and rigidity are secured.

We claim as our invention:

1. In a gear tooth rounding machine, the combination with a rotary tool and means for reciprocating it, of means for rotatably supporting a work piece in front of the tool, a drive gear operatively connected with said supporting means and located in front of the work piece for imparting rotary movement thereto, a shaft supporting said drive gear and a support therefor adjustable toward and from both the work piece and tool.

2. In a gear tooth rounding machine, the combination with means for rotatably supporting a work piece, a tool located at one side thereof and means for reciprocating it, of a drive gear operatively connected with said supporting means and positioned at the opposite side of the work piece, a shaft rotating the drive gear operatively connected to the tool reciprocating means, and a support for the drive gear shaft movable toward and from both the work piece and tool.

3. In a gear tooth rounding or chamfering machine, the combination with a tool, means for supporting a work piece or gear in coöperative relation with the tool, and means for reciprocating one of said parts relatively to the other, of a carriage adjustable relatively to the tool, a shaft on said carriage, a gear wheel on the shaft for driving the gear to be operated on by the tool, a worm wheel on said shaft, a worm carried by the carriage and coöperating with the worm wheel, and a shaft supported independently of the carriage and having the worm turning therewith and adjustable longitudinally thereof.

4. In a gear tooth rounding or chamfering machine, the combination with a tool means for rotatably supporting a work piece or gear in coöperative relation with the tool, and means for reciprocating one of said parts relatively to the other, of a carriage adjustable relatively to the tool, a shaft on said carriage, a gear wheel on the shaft for driving the gear to be operated upon by the tool, a worm wheel on said shaft, a worm on the carriage coöperating with the worm wheel, a shaft supported independently of the carriage and having the worm turning therewith and adjustable longitudinally thereof, and eccentric sleeve bearings in which the shaft of the carriage turns.

5. In a gear tooth rounding or chamfering machine, the combination with a rotary tool, and means for reciprocating said tool transversely of its axis of rotation, of a carriage adjustable in the direction parallel to the axis of rotation of the tool, means for rotatably supporting a work piece or gear on the carriage in a position to be operated upon by the tool, a drive gear for rotating the work piece supported by said carriage, and adjustable thereon relatively to the work supporting means.

6. In a gear tooth rounding or chamfering machine, the combination with a rotary tool, and means for rotatably supporting a work piece or gear in a position to be operated upon by said tool, of means for effecting the adjustment of the work supporting means in the direction parallel to the axis of the tool, means for reciprocating the tool transversely of its axis, a shaft extending in the direction of the axis of the tool, a carriage adjustable relatively to the work supporting means in the direction of the axis of said tool, a worm slidable on the shaft and turning with the latter and on the carriage, a worm wheel on the carriage, a shaft carrying said worm wheel, and a drive gear carried by the shaft to drive the work piece.

7. In a gear tooth rounding or chamfering machine, the combination with a rotary tool mounted to reciprocate transversely of its axis, and means for rotatably supporting a work piece or gear in position to be operated upon by said tool, of means for effecting the adjustment of the work supporting means in the direction parallel to the axis of the tool, a drive gear for driving the work piece, and common driving mechanism for the tool and the drive gear embodying means for reciprocating the tool transversely of its axis, a shaft, a worm slidable longitudinally of the shaft, a worm wheel meshing with the worm, and a shaft connected to the worm wheel and to the drive gear and adjustable longitudinally of the worm-carrying shaft in the direction of the axis of the tool.

8. In a gear tooth rounding or chamfering machine, the combination with a rotary tool and means for reciprocating said tool transversely of its axis of rotation, of a carriage adjustable longitudinally of the axis of the tool, a member rotatable thereon, means for clamping a work piece or gear on the rotatable member in position to be operated on by the tool, an indexing gear secured to said member, and a driving gear adjustable toward and from the axis of the rotating member.

9. In a gear tooth rounding or chamfering machine, the combination with a tool, a rotatable work-supporting shaft and means for reciprocating one of said parts relatively to the other, of a carriage adjustable relatively to the tool and having the work-supporting shaft carried thereby and projecting therefrom, means for clamping a work piece or gear on said shaft in a position to be operated on by the tool, an indexing gear secured to said shaft, a removable bracket for supporting the free end of the shaft, and a driving gear for the work piece adjustable toward and from the axis of the shaft.

10. In a gear tooth rounding and chamfering machine, the combination with a frame, means for rotatably supporting a work piece or gear on said frame, and a rotary tool, of a table rotatably adjustable about a vertical axis on the frame and supporting the tool for rotation about a horizontal axis in a position to operate on a work piece carried by the supporting means.

11. In a machine for rounding or chamfering the teeth of gears, the combination with means for rotatably supporting a work piece or gear and a tool for coöperation with the work piece or gear thus supported, of mechanism for reciprocating the tool comprising a cam, a pivoted lever having one end coöperating with the cam, a yoke pivotally supported by the other end of the lever, a screw rod journaled in the yoke, and a nut carried with the tool and engaging the screw rod.

ARTHUR H. INGLE.
ALPHONSE J. GOSSELIN.

Witnesses:
MAIDA H. SNYDER,
RUSSELL B GRIFFITT